United States Patent Office 3,257,096
Patented June 21, 1966

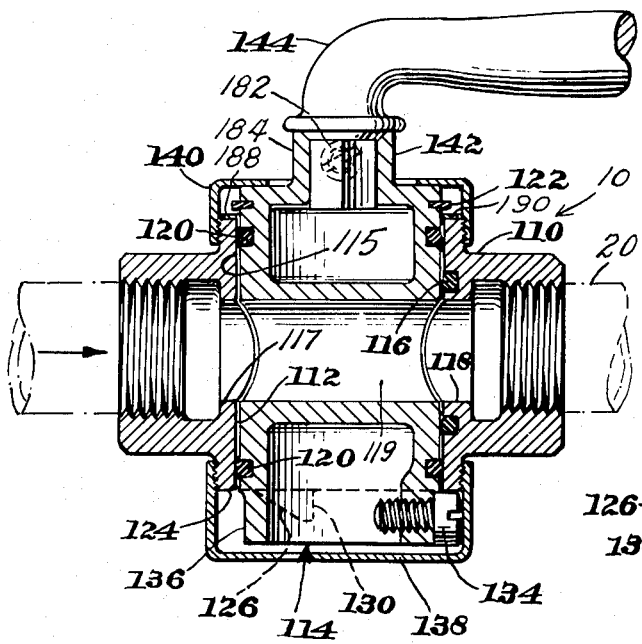
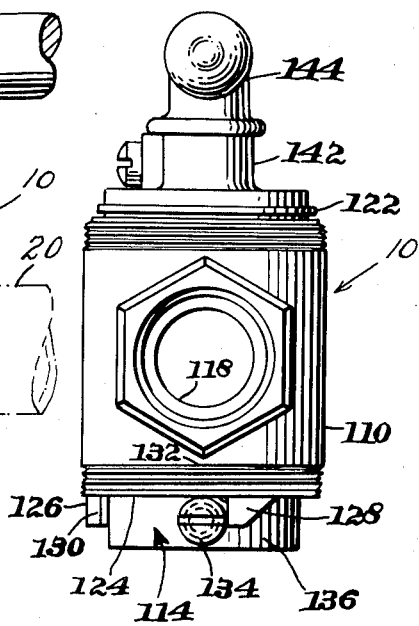
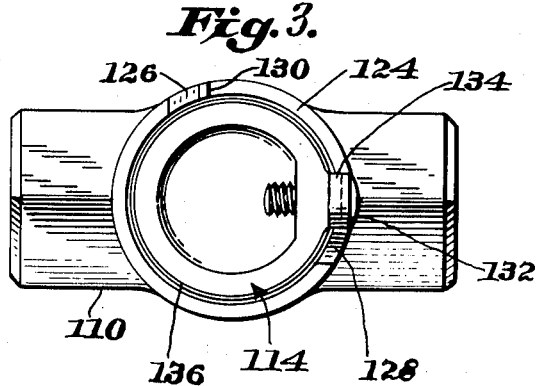

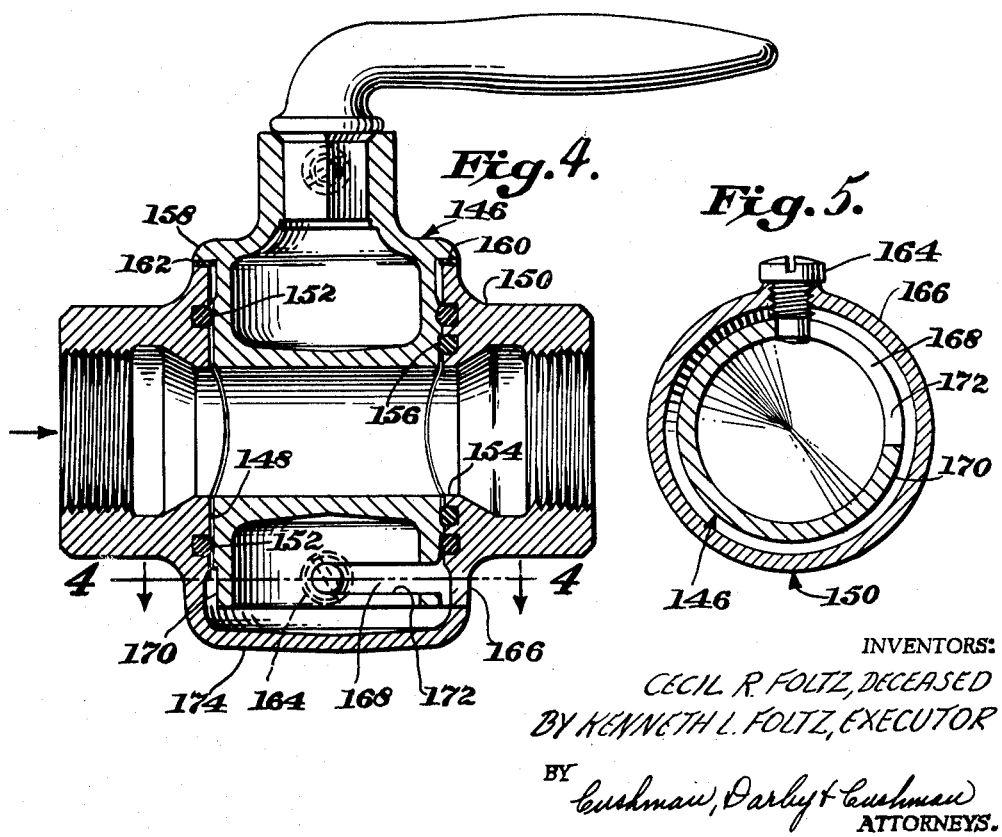

3,257,096
ROTARY PLUG VALVE WITH STOP MEANS
Carl E. Floren, Decatur, Ill., Cecil R. Foltz, deceased, late of Whittier, Calif., by Kenneth L. Foltz, legal representative, Whittier, Calif., assignors to Mueller Co., Decatur, Ill., a corporation of Illinois
Original application Mar. 3, 1960, Ser. No. 12,645, now Patent No. 3,066,908, dated Dec. 4, 1962. Divided and this application Oct. 10, 1962, Ser. No. 229,759
8 Claims. (Cl. 251—287)

This invention relates to improvements in rotary plug valves. While the invention will be described with particular reference to a rotary plug valve of the type shown in the patent to Mueller 2,547,831, it will be realized that many of the features of the invention are applicable to other types of rotary plug valves.

This application is a division of our copending application Serial No. 12,645, filed Mar. 3, 1960, now Patent 3,066,908, Dec. 4, 1962.

The valve disclosed in the aforementioned patent is of the type that has a cylindrical valve seat provided with an endless groove surrounding the seat outlet port, and an O-ring is disposed in such groove for sealing engagement with the opposed cylindrical surface of the plug. The valve seat is closed at one end by a combined sealing and plug-retaining closure threadedly engaged with an annular extension of the valve housing, while a seal is effected for the other end of the seat by an O-ring disposed in a groove in a reduced extension of the plug for sealing engagement with the opposed surface of a bore forming a reduced extension of the valve seat.

While the aforedescribed valve has proved to be eminently satisfactory for its intended purpose, it still is subject to being improved. For example, the valve shown in that patent is not balanced, i.e., the net pressure force acting on the valve, by the fluid which it controls, tends to urge the valve axially, with the result that at higher pressures the valve becomes somewhat more difficult to turn. Additionally, the abovedescribed valve is not provided with stop elements, frequently termed a "check" in the art, to limit the rotational movements of the plug to 90° in turning between open and closed positions.

It is, therefore, an object of this invention to provide an improved pressure-balanced rotary plug valve of the type that has an endless sealing ring in a seat groove surrounding the seat outlet port.

It is another object of this invention to provide an improved rotary plug valve of the aforedescribed type with novel stop elements to limit rotation of the plug to 90° in turning between open and closed positions.

It is another object of this invention to provide a pressure-balanced rotary plug valve with improved stop elements which not only serve the function of a check, but also aid in retaining the valve plug in its seat.

It is a further object of this invention to provide an improved rotary plug valve of simple and consequently inexpensive construction, but which also is extremely effective for its intended purpose.

Other objects and advantages of the present invention will become apparent from the following description and accompanying drawings in which:

FIGURE 1 is a vertical sectional view of a rotary plug valve embodying this invention.

FIGURE 2 is a right-hand end view of the valve shown in FIGURE 1, but with the end caps removed.

FIGURE 3 is a bottom view of the valve shown in FIGURE 2.

FIGURE 4 is a view corresponding to FIGURE 1 but illustrating a modified form of a valve embodying this invention.

FIGURE 5 is a sectional view taken substantially on line 4—4 of FIGURE 4.

Referring now to FIGURES 1, 2 and 3 of the drawings, there is shown a rotary plug valve 10 having a valve housing 110 provided with a cylindrical valve seat 112 of uniform diameter having diametrically opposite inlet and outlet ports 117 and 118, respectively. The ports 117 and 118 may be interiorly threaded at their outer ends for connecting the valve 10 into a line 20. Rotatably mounted in the seat 112 is a valve plug 114 having an exterior cylindrical surface 115 of uniform slightly smaller diameter than that of the valve seat 112 and coextensive therewith. The valve plug 114 may be formed as a hollow shell having diametrically opposite ports adapted to register with the seat ports in the open position of the valve or may be formed, as shown, with a transverse flow passage 119 of uniform diameter, the opposite ends of which align or register with the seat ports 117, 118 in the open position of the valve 10. At its opposite ends, i.e., on opposite sides of the flow passage 119, the plug 114 may, as shown, be formed with hollow socket-like or sleeve-like configurations in order to save weight and material.

Surrounding the outlet port 118 in the valve seat 112 is an endless groove of uniform depth, and an O-ring 116 is disposed in such groove for sealing engagement with the opposed surface 115 of the plug 114 to form a tight seal when the valve is closed, as is disclosed in greater detail in the aforementioned patent to Mueller. Adjacent both ends of the seat, and outwardly beyond the O-ring 116, the valve plug 114 is provided with circumferential grooves, each generally rectangular in radial section. Disposed in each groove is an O-ring 120 which has sealing engagement with at least one wall of its groove, and also with the opposed cylindrical surface of the valve seat 112 in order to provide a seal between the plug 114 and the seat 112 at both ends of the latter.

Rotation of the valve plug 114 between its open and closed position is preferably accomplished by means of a handle 144 secured, as by means of a set screw 182, in an interiorly reduced tubular extension 184 on one end of the plug 114. Alternatively, as will be apparent to one skilled in the art, the plug 114 can be reduced outwardly beyond the valve seat and formed so as to terminate in a flattened noncircular head for engagement by a wrench, or by hand, in order to turn the valve plug 114 to open and close the valve.

Axial movement of the valve plug 114 in one direction, i.e., downwardly, as shown in FIGURE 1, is prevented by means of a split ring 122 disposed in a circumferential groove in the plug just outwardly beyond one end of the valve seat 112, and opposed to an annular bearing surface 188 on the housing 110. Preferably, a brass thrust washer 190 is interposed between the ring 122 and the housing 188.

At the other end of the seat 112, the housing 110 is provided with a flat outwardly-facing annular bearing surface 124 having a pair of projections 126 and 128 thereon defining a pair of circumferentially-spaced stop surfaces 130 and 132 disposed generally radially and normally of the bearing surface 124. Disposed between the surfaces 130 and 132 for alternative cooperation therewith to limit the rotational movements of the plug to 90° in turning between its open and closed positions, is the head of a screw 134 threaded into a tapped radial aperture in a thickened portion of an annular extension 136 on the plug 114 extending outwardly beyond the surface 124. Obviously the screw head bears against the surface 124 to retain the plug 114 in its seat 112. It will thus be seen that the overlapping engagement of the split ring 122 with the bearing surface 188, or as preferred, with the thrust washer 190 interposed therebetween, prevents movement of the valve plug 114 axially in one direction, i.e., downwardly, as shown in FIGURE 1, while overlapping engagement between the screw 134 and the bearing surface 124 retains the valve plug 114 in its seat 112 against axial movement in the other direction, i.e., upwardly, as shown in FIGURE 1.

The screw 134, projections 126 and 128 and adjacent O-ring 120 may be protected from the weather, dirt, and the like, by a closure cap 138 threaded onto an exteriorly threaded annular extension on the valve housing 110. The opposite end of the seat 112 may likewise be protected by a similar cap 140 that is centrally apertured to accommodate the reduced extension 142 of the plug 114 in which is secured the valve operating handle 144.

All of the parts of the valve 10 shown in FIGURE 1, with the exception of the O-rings 116 and 120, may be formed of metal, but such parts particularly lend themselves to being formed of relatively rigid, synthetic plastics. Valves formed of such plastic materials not only can be produced relatively inexpensively, but serve admirably for certain purposes.

Referring now to FIGURES 4 and 5 of the drawings there is shown a modification of the invention wherein a cylindrical plug 146 is rotatable in a cylindrical valve seat 148, and the seat is sealed in a valve housing 150, and the seat is sealed at its opposite ends by O-rings 152 disposed in circumferential grooves in the seat instead of being disposed in circumferential plug grooves in the manner illustrated in FIGURE 1. In a manner similar to the embodiment of the invention shown in FIGURE 1, a seal is effected between the seat outlet port 154 and the plug 146, in the closed position of the latter, by an O-ring 156 disposed in an endless seat groove surrounding the outlet port.

Axial movement of the valve plug 146 in one direction is prevented by a circumferential flange 158 on the plug located outwardly beyond one end of the seat 148 and opposed to an annular bearing surface 160 on the housing 150. Preferably, a brass thrust washer 162 is interposed between the flange 158 and the housing surface 160. Axial movement of the valve plug 146 in the opposite direction is prevented by means of a smooth inner end of a screw 164 threaded into a tapped radial aperture in a sleeve-like annular extension 166 of the housing 150 at the other end of the valve seat. The screw 164 extends into an arcuate slot 168 in a sleevelike extension 170 of the plug 146, the annular extent of the slot being such as to limit to 90° the movements of the plug in turning between valve open and valve closed positions. It will be seen that the engagement between the inner end of the screw 164 and the lower surface 172 of the slot 168 will retain the plug 146 in its seat 148. Preferably, the valve is of the type known in the trade as having a "closed bottom," which means that one end of the valve seat 148 is closed by an integral part 174 of the housing 150.

Of course, the engagement between the inner end of the screw 164 and the opposed surfaces of the slot 168 retain the plug 146 in its seat 148 against axial movement in either direction. Hence, the flange 158 serves the primary purpose to keep grit and dirt from working between the valve plug 146 and its seat 148.

It thus will be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims.

What is claimed is:

1. A rotary plug valve comprising:
    (a) a housing member having a cylindrical valve seat of uniform diameter throughout its length and a pair of diametrically disposed flow ports opening thereto;
    (b) a cylindrical plug member rotatable in said seat and having a flow passage movable into and out of registry with said seat ports to open and close the valve;
    (c) means defining an annular bearing surface on said housing member adjacent one end, and facing outwardly, of said seat;
    (d) means defining a circumferential plug-member-retaining flange on, and extending radially outwardly of, said plug member into overlapping engagement with said bearing surface for preventing axial movement of said plug member in one direction;
    (e) means defining an arcuate bearing surface on one of said members adjacent the other end, and facing outwardly, of said seat;
    (f) means defining a pair of circumferentially-spaced stop surfaces on said one member at the opposite ends of said arcuate bearing surface;
    (g) and a combined stop and retaining element comprising a screw engaged in a tapped aperture in the other of said members, said screw extending radially thereof into overlapping engagement with said arcuate bearing surface and circumferentially between said stop surfaces, whereby said overlapping engagement prevents axial movement of said plug member in the other direction and the engagement of said combined stop and retaining element with said stop surfaces limits the extent of rotation of said plug member.

2. The structure defined in claim 1 in which the arcuate bearing surface and stop surfaces are on the housing member and the combined stop and retaining element is on the plug member.

3. The structure defined in claim 1 in which the arcuate bearing surface and stop surfaces are on the housing member and including a cap threaded onto said housing member and closing the other end of said seat and enclosing said arcuate bearing surface, said stop surfaces, and said element.

4. The structure defined in claim 1 in which the arcuate bearing surface and stop surfaces are on the housing member and the circumferential flange comprises a snap ring engaged in a circumferential groove in the plug member.

5. The structure defined in claim 1 in which the arcuate bearing surface and stop surfaces are defined respectively by one side and the end edges of a circumferential slot in the plug member and the combined stop and retaining element is on the housing member and extends radially into said slot.

6. The structure defined in claim 5 including an integral portion of the housing member closing the other end of the seat and enclosing the corresponding end of the plug member.

7. A rotary plug valve comprising:
    (a) a housing member having a cylindrical valve seat of uniform diameter throughout its length and a pair of diametrically disposed flow ports opening thereto;
    (b) a cylindrical plug member rotatable in said seat and having a flow passage movable into and out of registry with said seat ports to open and close the valve;
    (c) means defining a circumferentially extending arcuate slot in said plug member adjacent one end of said seat;
    (d) and a combined stop and retaining element comprising a screw engaged in a tapped aperture so as to be removably mounted to said housing member and projecting radially into said slot and in engagement slidingly with the opposite side edges thereof and alternatively with opposite end edges thereof, engagement with said side edges being effective to prevent axial movement of said plug member in either direction, and alternative engagement with said opposite end edges being effective to limit the extent of rotation of said plug member.

8. The structure defined in claim 7 including an integral portion of the housing member closing the one end of the valve seat and enclosing the corresponding end of the plug member.

References Cited by the Examiner

UNITED STATES PATENTS

| | | | |
|---|---|---|---|
| Re. 24,102 | 12/1955 | Ohls | 251—317 X |
| 262,935 | 8/1882 | Dibble | 251—317 |
| 266,132 | 10/1882 | Goodrich | 251—227 |
| 699,659 | 5/1902 | Colvin | 251—286 X |
| 1,193,755 | 8/1916 | Bentz | 251—286 X |
| 1,293,753 | 2/1919 | Gibson | 251—286 X |
| 2,511,477 | 6/1950 | Mueller | 251—182 |
| 2,547,831 | 4/1951 | Mueller | 251—309 X |
| 2,589,244 | 3/1952 | Gould | 137—246.2 |

FOREIGN PATENTS

| | | |
|---|---|---|
| 643,365 | 6/1962 | Canada. |
| 979,659 | 12/1950 | France. |
| 743,891 | 1/1956 | Great Britain. |

ISADOR WEIL, *Primary Examiner.*

WILLIAM F. O'DEA, *Examiner.*

J. O'NEILL, *Assistant Examiner.*